United States Patent
Sanna

(10) Patent No.: US 11,964,817 B2
(45) Date of Patent: Apr. 23, 2024

(54) APPARATUS FOR THE SEPARATE COLLECTION OF RUBBISH

(71) Applicant: REPOD S.R.L., Cagliari (IT)

(72) Inventor: Alberto Sanna, Cagliari (IT)

(73) Assignee: REPOD S.R.L., Cagliari (IT)

( * ) Notice: Subject to any disclaimer, the term of this patent is extended or adjusted under 35 U.S.C. 154(b) by 456 days.

(21) Appl. No.: 17/424,727

(22) PCT Filed: Dec. 24, 2019

(86) PCT No.: PCT/EP2019/087010
§ 371 (c)(1),
(2) Date: Jul. 21, 2021

(87) PCT Pub. No.: WO2020/151895
PCT Pub. Date: Jul. 30, 2020

(65) Prior Publication Data
US 2022/0009706 A1   Jan. 13, 2022

(30) Foreign Application Priority Data

Jan. 24, 2019   (IT) .............. 102019000001039

(51) Int. Cl.
*B65F 1/00* (2006.01)
*B02C 25/00* (2006.01)
*B65F 1/10* (2006.01)
*B65F 1/14* (2006.01)

(52) U.S. Cl.
CPC .............. *B65F 1/006* (2013.01); *B02C 25/00* (2013.01); *B65F 1/10* (2013.01); *B65F 1/1405* (2013.01); *B02C 2201/06* (2013.01); *B65F 2001/008* (2013.01); *B65F 2210/138* (2013.01); *B65F 2210/168* (2013.01); *B65F 2210/169* (2013.01); *B65F 2210/176* (2013.01); *B65F 2210/182* (2013.01); *B65F 2210/184* (2013.01)

(58) Field of Classification Search
CPC .................. B65F 2001/008; B65F 2210/176
See application file for complete search history.

(56) References Cited

U.S. PATENT DOCUMENTS

| | | | | |
|---|---|---|---|---|
| 5,257,577 A * | 11/1993 | Clark | .................... | B65F 1/0093 209/706 |
| 5,568,871 A * | 10/1996 | Shantzis | ............... | B65F 1/0093 209/706 |
| 5,645,172 A * | 7/1997 | Shantzis | ............... | B30B 9/3085 209/706 |
| 8,555,781 B1 * | 10/2013 | Garcia | .................. | B65F 1/1405 100/98 R |

FOREIGN PATENT DOCUMENTS

| | | |
|---|---|---|
| CN | 108313564 | 7/2018 |
| CN | 109095027 | 12/2018 |
| IT | 20154595 | 5/2017 |

OTHER PUBLICATIONS

International Search Report as filed in PCT/EP2019/087010 mailed May 14, 2020.

* cited by examiner

*Primary Examiner* — Don M Anderson
(74) *Attorney, Agent, or Firm* — Rankin, Hill & Clark LLP

(57) ABSTRACT

An apparatus for the separate collection of rubbish includes a containing structure provided with an internal compartment in which there are a plurality of rubbish collection containers and at least a first and a second aperture for access to the internal compartment from the outside, in order to introduce the rubbish.

11 Claims, 3 Drawing Sheets

APPARATUS FOR THE SEPARATE COLLECTION OF RUBBISH

FIELD OF THE INVENTION

The present invention concerns an apparatus for the separate collection of rubbish, in particular but not exclusively household waste. More specifically, the present invention concerns an apparatus, which is able be associated for example with items of furniture such as sinks, cabinets, shelf units, chests of drawers or others, which is provided inside with a plurality of containers for the separate collection of rubbish.

BACKGROUND OF THE INVENTION

Separate collection of household, urban, industrial or other waste is known, and increasingly widespread and encouraged, in order to reduce the disposal costs thereof, promote the recycling of materials, reduce environmental impact and more.

This type of known separate rubbish collection provides to separate rubbish according to type, so that it can be discharged and disposed of in a specific way, according to whether it is paper, plastic, glass, metal, organic waste or other.

This type of collection, while having considerable economic and environmental benefits, is sometimes impractical and complex, since users have to separate the rubbish individually and deposit it, according to the material, in specific containers supplied.

Sometimes the rubbish has a significant size, therefore it can be left near the corresponding containers, creating problems of accessibility and in some cases of tidiness of the urban environment.

Considering that for each type of material often days can pass between each rubbish collection, the containers supplied have relatively bulky sizes in order to contain a determinate quantity of rubbish of the corresponding material; moreover, this can generate, in the event the rubbish is left for a prolonged period of time, unpleasant odors and the presence of insects or other animals especially in the case of organic waste.

Apparatuses for the collection of rubbish assembled in kitchen modules, inside suitable drawers, have been developed relatively recently. These apparatuses generally support two or more different receptacles for the separate collection of rubbish.

This known solution allows a limited separation of different materials and, in order to contain the overall size and keep them within normal standard sizes, it usually has very small containers that have to be emptied frequently.

Systems have also been proposed in which it is provided to grind and compact the rubbish in the containers, however these systems are generally bulky and potentially dangerous, particularly for children and the elderly.

Furthermore, it is known that rubbish, in order to be recycled, is given to a recycling center so that it can be further separated and selected, automatically and/or manually.

In addition, the recycling process generally continues in other specialized centers or in the same recycling center with shredding, separation according to color and composition, washing, other possible treatments and the shipping of the different recyclable materials, such as for example plastic, paper, glass and/or metals, to companies contracted for rubbish disposal, to industries, factories or plants interested in the reuse of these materials.

Consequently, the entire collection and recycling process is rather cumbersome and costly in terms of time, expenses and bulks.

One purpose of the present invention is to provide an apparatus for the separate collection of rubbish which allows to carry out the collection and separation of different types of rubbish in a simple and effective manner, and which makes the separate collection easier for a user, household or otherwise.

Another purpose of the present invention is to provide an apparatus for the separate collection of rubbish which reduces the bulk of the rubbish and the corresponding containers, and limits the negative effects of rubbish being left for a prolonged period of time, for example unpleasant odors, percolation or suchlike.

Another purpose of the present invention is to provide an apparatus for the separate collection of rubbish which allows to monitor the production of urban waste and to simplify the entire recycling process, reducing and optimizing the steps of the process which third parties, such as for example recycling centers or specialized centers for the disposal and/or recycling of rubbish, are responsible for.

Another purpose is to allow to gather the recycling data of the individual user such as emptying frequency and quantity of rubbish delivered in weight or volume, allowing the data to be shared with the municipality and the recycling center, with a consequent more precise monitoring of urban waste and optimization of the processes.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, an apparatus for the separate collection of rubbish according to the present invention comprises a containing structure provided with an internal compartment in which there are a plurality of rubbish collection containers, and with at least a first and a second aperture for access to the internal compartment from the outside, in order to introduce the rubbish.

According to one aspect of the invention, the plurality of containers as above is disposed on a mobile support the drive of which is controlled, for example automatically, by the action of means, for example sensors, that recognize the type of rubbish, these recognition means being associated with the first and second apertures, in order to position a specific one of the containers selected in a correct reception position.

According to one embodiment, the first aperture can be intended for the introduction of food waste into the apparatus, and the second aperture can be intended for the introduction of all other recyclable waste, such as for example paper, glass, plastic and metal.

By food waste we mean all the waste originating from organic food waste that can be identified, as a non-limiting example, as organic waste, used cooking oil or suchlike.

By recyclable waste we mean all the waste originating from inorganic waste material that can be recycled, for example glass, paper, plastic and metal.

Advantageously, the presence of only two apertures for introducing the rubbish reduces the intervention of the user of this apparatus, making the separate collection of rubbish easier for him/her and simplifying the apparatus' operations.

Advantageously, the apparatus is suitable to recover different types of recyclable waste, supporting the subsequent recycling and treatment steps carried out by specialized centers.

Advantageously, moreover, the presence of sensors that recognize the type of rubbish at the time it is introduced into the apparatus relieves the user from the responsibility of having to select and identify the correct container, as well as considerably reducing errors and the mixing of non-homogeneous rubbish.

According to one embodiment, the apparatus also comprises at least one rubbish shredding member to reduce its sizes. This shredding member is particularly useful in the case of recyclable waste which is at least partly made of rigid material and of considerable size.

According to another embodiment, the apparatus also comprises at least one compacting member for compacting the rubbish in the containers.

In this way, a greater quantity of rubbish can be deposited and squeezed in, even in relatively small containers, than is possible in the state of the art, without therefore requiring frequent operations to empty the containers themselves. This proves to be particularly practical and considerably facilitates the operations of separate collection and discharge of the rubbish produced, also optimizing the collection process carried out by the municipalities or contracted companies. This also allows to contain the overall size of the apparatus, allowing it to be positioned even in association with items of furniture normally found in homes. In this way, the separate collection of rubbish can be effectively and conveniently carried out directly in those places where the rubbish is normally generated, such as for example kitchens, closets, cellars, bathrooms, terraces, garages or suchlike.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF SOME EMBODIMENTS

Figure 2:
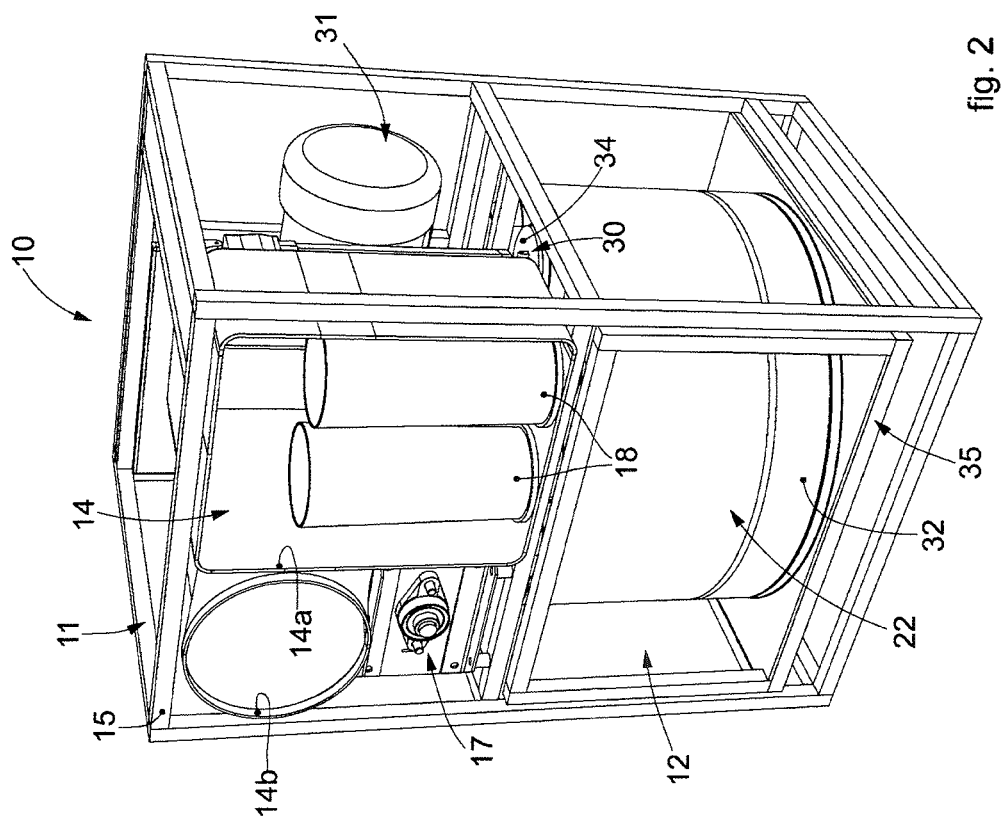
FIG. 2 is another perspective view of the apparatus in FIG. 1.
Figure 1:
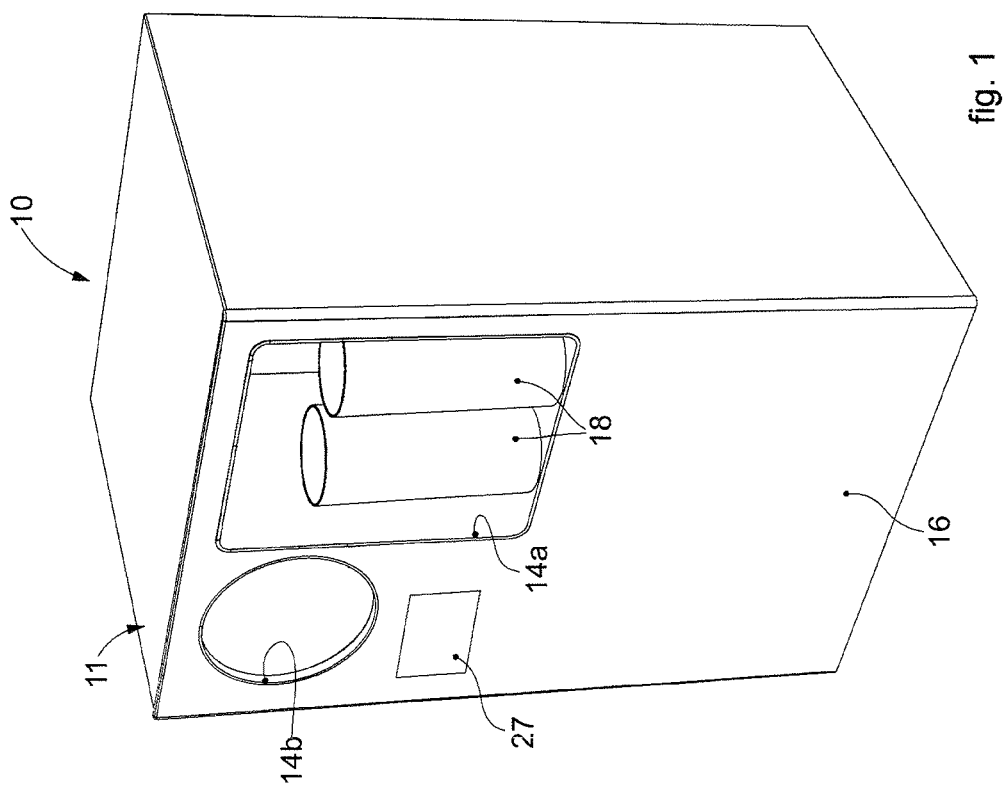
FIG. 1 is a perspective view of the apparatus for the separate collection of rubbish in accordance with the present invention.
Figure 4:
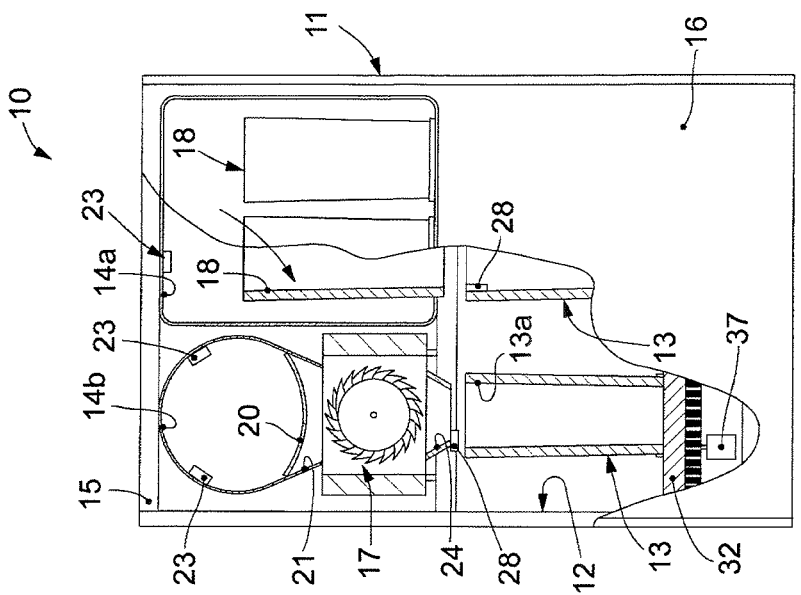
FIG. 4 is a partly sectioned front view of one embodiment of the apparatus in FIG. 1.
Figure 3:
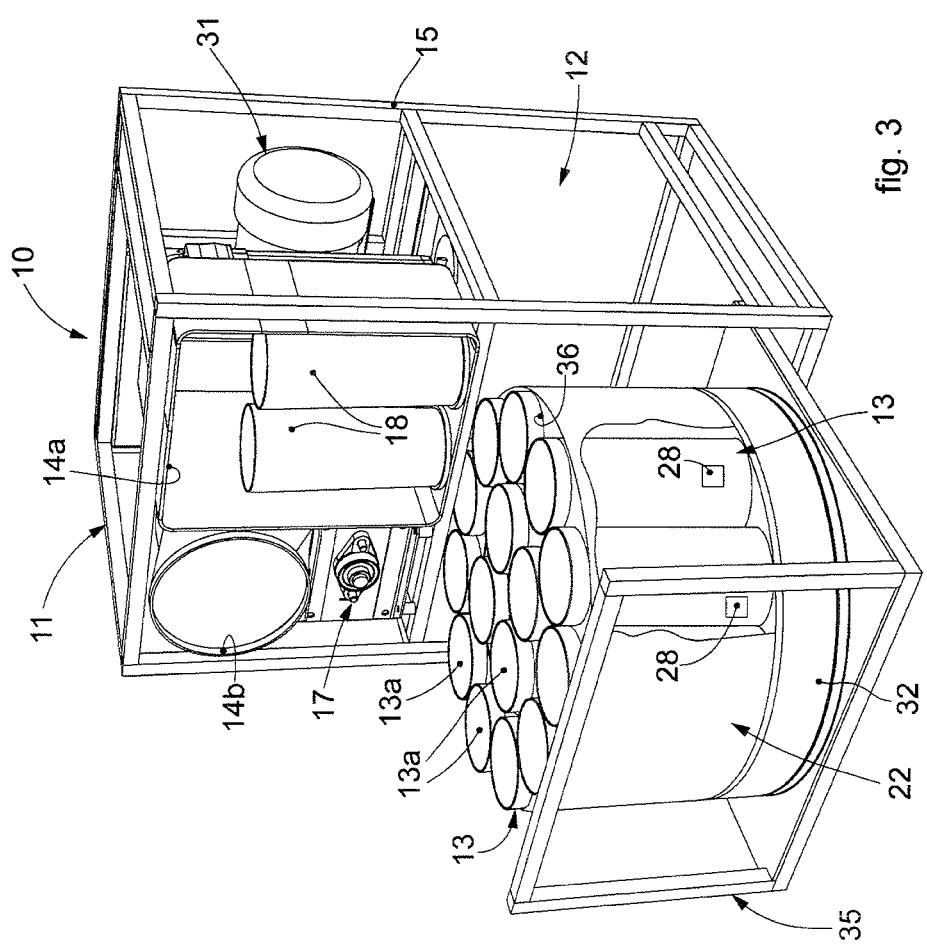
FIG. 3 is another perspective view of the apparatus in FIG. 1.
Figure 5:
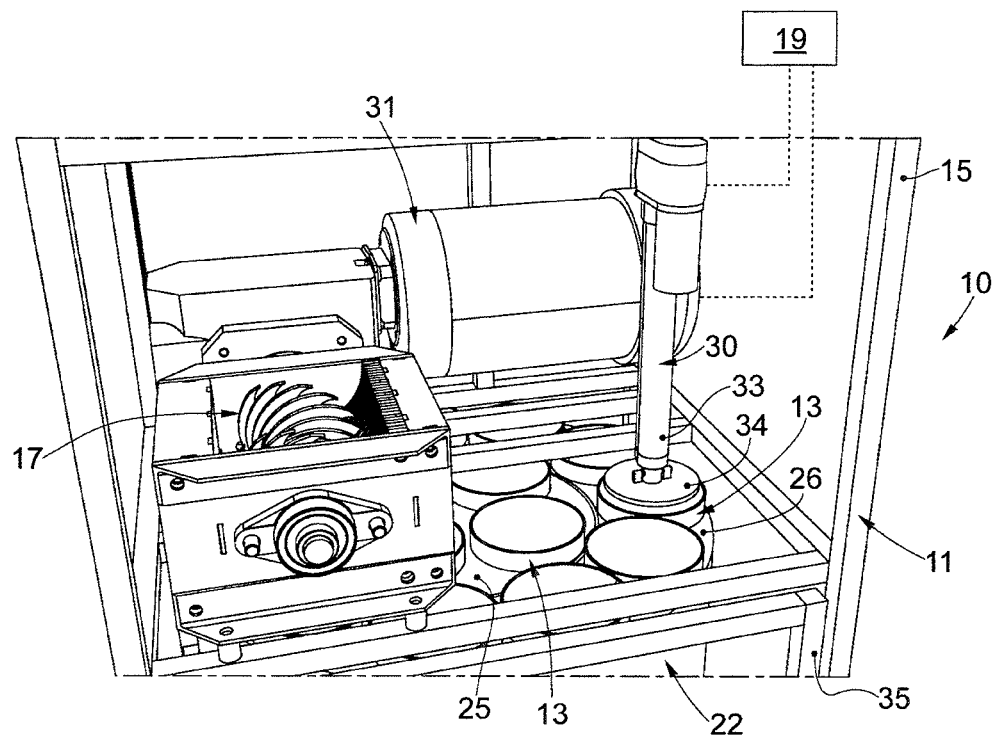
FIG. 5 is a perspective view of a detail of the apparatus in FIG. 1.
Figure 6:
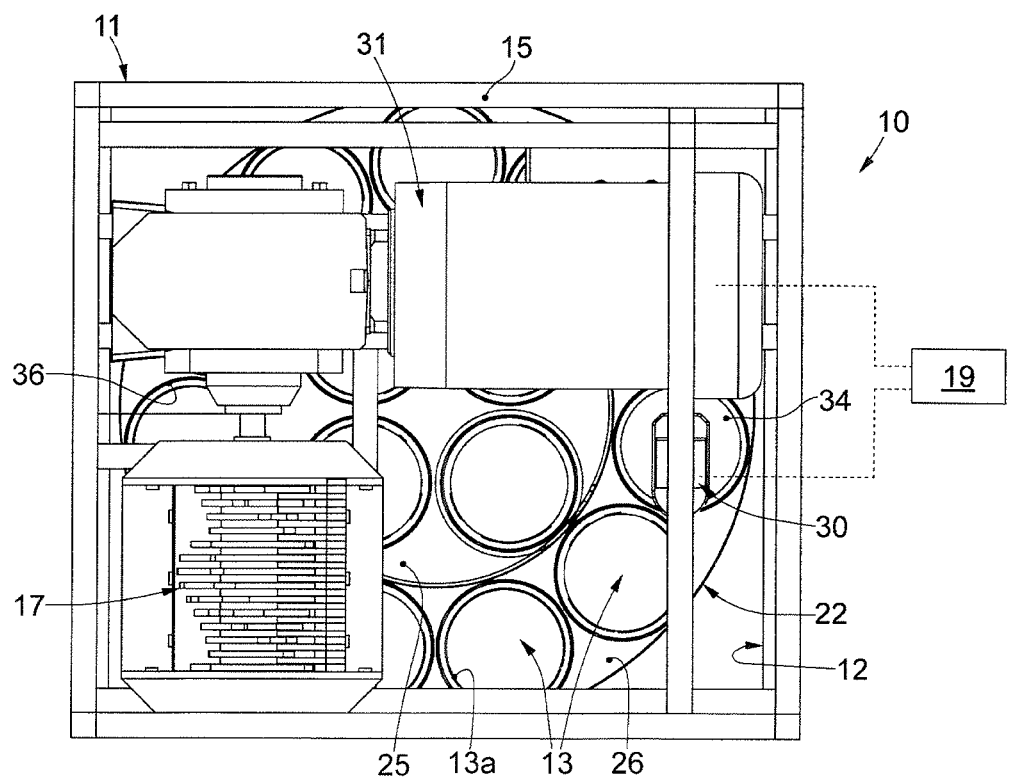
FIG. 6 is a view from above of the detail of FIG. 5.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

With reference to figs. from 1 to 6, an apparatus or appliance for the separate collection of rubbish according to the present invention is shown by way of example.

The apparatus 10 comprises a containing structure 11 having an external conformation and an overall size such as to allow its positioning in association with an item of kitchen furniture, for example under a sink, or under a work surface, or in a bathroom cabinet, or other, without changing the standard sizes of the item of furniture. For example, the apparatus 10 could have the standard sizes of a washing machine or dishwasher, or other household appliance which can be inserted in a kitchen module or suitable compartment.

The containing structure 11 can possibly have a non-standard or otherwise customizable conformation and size.

The apparatus 10 can be used in any single-family, multi-family dwelling whatsoever, or in a condo, hotel, camping sites, apartment or small and medium-sized commercial building.

Furthermore, the apparatus 10 can also be used in various formats and sizes on means of transport, such as campers, trains, airplanes and ships, such as yachts or cruise ships.

According to the invention, the containing structure 11 is provided with an internal compartment 12 in which there are a plurality of rubbish collection containers 13 and with at least two different apertures 14 which allow access to the internal compartment 12 from the outside, to allow the introduction of the rubbish.

According to the invention, the containing structure 11 is provided with a frame 15 on which at least one front panel 16 is applied facing, during use, toward the user. For example, the structure 11 can be installed completely recessed in a wall, so that the front panel 16 is level with a wall, or integrated in a wall unit or in a module of an item of kitchen furniture.

The containers 13 are open at the upper part, being provided with a loading aperture 13a provided to introduce the rubbish into the containers 13.

According to one embodiment, the front panel 16 is able to be opened, or partly opened, so that it is possible to extract the containers 13 in order to empty them.

Furthermore, the containers 13 are reciprocally conformed and sized so as to be able to respect the sizes and the conformation of the containing structure 11, optimizing the collection spaces and the overall bulk.

The rubbish introduction apertures 14a, 14b are, in this specific case, made on the front panel 16 of the containing structure 11 so as to be easy to reach by the user if the apparatus 10 is recessed under a sink or a kitchen counter or wall, or in other dedicated spaces.

In any case, it is within the scope of the invention to provide that the apertures 14a, 14b are made on the upper side of the containing structure 11, one on the front side and one on the upper side, or in any side or wall whatsoever of the containing structure 11.

According to one embodiment, the apertures 14a, 14b can be distinguished between a first aperture 14a intended exclusively for food waste, such as organic waste and/or used oil, and a second aperture 14*b* intended exclusively for all other recyclable waste, such as for example paper, glass, plastic and metal.

The first aperture 14*a* can be advantageously connected to two separate inlets 18, for example one intended to receive used cooking oil and one intended to receive organic waste. In this way, different types of food waste that require different treatments for their disposal or reuse, for example as raw material for the production of fertilizers or fuels, are immediately separated from each other.

According to another embodiment, a shredding member 17 is associated with the second aperture 14*b* for grinding and pulverizing the recyclable waste such as paper, glass, plastic, metals.

The shredding member 17 could be, for example, a stainless steel grinder.

According to one embodiment, the apertures 14*a*, 14*b* can each be provided with a door (not shown) of the panel, shutter, book or other known type. This door can be of the type that is opened manually or automatically.

This automatic opening can be associated with at least one motion sensor that detects the approach of the rubbish to the door.

According to one embodiment, the second aperture 14*b* is advantageously provided with a door that closes automatically after the rubbish is introduced. In another embodiment, the shredding member 17 is suitable to be activated, manually or automatically, only after the automatic closure described above.

Consequently, this automatic closure of the door which puts the second aperture 14*b* in communication with the outside guarantees a first level of safety for the user, so that the latter does not come into contact, accidentally or voluntarily, with the shredding member 17.

According to one embodiment, the apparatus 10 can comprise at least one command and control unit 19, or control panel, configured to receive the signal of closure from the door and command the switching on/off of the shredding member 17.

This automatic closure can be controlled, for example, by the command and control unit 19 by means of a timer which automatically closes the door after a determinate interval of time.

According to one embodiment, in cooperation with the second aperture 14*b*, a temporary support 20 can be provided suitable to contain the rubbish before it is shredded by the shredding member 17. The temporary support 20 separates the aperture 14*b* from the shredding member 17. In particular, the temporary support 20 has a first position, directly associated with the second aperture 14*b*, in which the rubbish is temporarily kept, and a second position in which the rubbish is discharged toward the shredding member 17.

According to one embodiment, the temporary support 20 is configured to move to the position of discharge of the rubbish toward the shredding member 17 after the closure of the door associated with the second aperture 14*b*. In this way, the temporary support 20 provides an additional level of safety to prevent contact between the user and the shredding member 17.

According to one embodiment, the temporary support 20 can consist of a hatch.

According to another embodiment, the temporary support 20 can be a concave or semi-cylindrical rotating shelf, for example cup-shaped or similar, rotatable by at least 180°, so as to allow the complete discharge into the shredding member 17 of all rubbish present on the temporary support 20 itself.

According to one embodiment, the rotation of the rotating temporary support 20 can be commanded manually by the user, by means of a possible command interface 27 provided on the front panel 16, once the door is closed.

According to another embodiment, the temporary support 20 can be connected to the command and control unit 19 so that its rotation is commanded electronically, thus guaranteeing greater safety for the user.

According to a variant embodiment, between the temporary support 20 and the shredding member 17 there can be provided a loading funnel 21, configured to better channel the rubbish toward the shredding member 17.

According to one aspect of the invention, the plurality of containers 13 is disposed on a mobile support 22 the drive of which, by means of movement means 37, is controlled by the action of means 23 that recognize the type of rubbish which are associated with the apertures 14*a*, 14*b*, so as to position, with the modes better explained below, a specific one of the containers 13 selected in a correct reception position.

The movement means 37 can be of any type whatsoever, as a non-limiting example, one or more electric motors, or one or more pneumatic or hydraulic actuators, or other similar element. Braking or cushioning means, or movement control means in general, can be associated with said mobile support 22 in order to manage and promote the controlled movement thereof.

According to one embodiment, the number of containers 13 disposed on the mobile support 22 can vary, as a function of the specific collection requirements and the overall bulk available.

Each specific container 13 is used for a single type of rubbish. In particular, the containers 13 can be selectively intended for the separate collection of plastic, paper, metal, glass, organic waste and used oil.

According to one embodiment, the correct reception position is defined by the type of rubbish identified by the recognition means 23.

This correct reception position is obtained when the loading aperture 13*a* of a specific container 13 is disposed in correspondence and aligned with the discharge of the rubbish of the apertures 14*a*, 14*b*.

In other words, when the recognition means 23 have identified the type of rubbish that is being discharged, through one of the apertures 14*a*, 14*b*, inside the apparatus, the mobile support 22 is activated to place the specific and corresponding container 13 in the position to receive the rubbish.

According to one embodiment, the recognition means 23 can comprise sensors, cameras or other devices suitable to recognize and differentiate the rubbish based on the color or weight or composition, or on combinations thereof.

The recognition means 23 can, in particular, be of any type whatsoever, for example optical, capacitive, magnetic, or other suitable type, and be or not be integrally equipped with, or connected to, a processing unit able to discriminate in a substantially instantaneous manner the type of rubbish being discharged.

The recognition means 23 can be associated with both the first aperture 14*a* and also the second aperture 14*b*.

Once the type of rubbish being discharged is recognized, the mobile support 22 is driven in order to place the specific container 13 in the correct reception position, associated with the path for discharging the rubbish.

According to one embodiment, a first reception position can be disposed directly under the first aperture 14a if the rubbish is of the organic food waste type.

According to one embodiment, a second reception position can be disposed directly under the second aperture 14b if the rubbish is of the recyclable type, that is, plastic, metal, paper or glass.

According to one embodiment, the second reception position can be located directly under the outlet of the shredding member 17.

Under the shredding member 17 there can be provided a discharge funnel 24 in order to channel the shredded and pulverized rubbish into the container 13 used for said rubbish.

The mobile support 22 can be provided with at least two concentric planes 25, 26, for example a circular 25 or central plane, in which the containers 13 suitable to collect food waste, for example organic waste and used oil, are disposed, and an annular 26 or peripheral plane, in which the containers 13 suitable for the separate collection of recyclable waste, for example glass, paper, plastic and metals, are disposed in a circle, one adjacent to the other.

Advantageously, the annular plane 26 can contain a greater number of containers 13 than the circular plane 25. Consequently, disposing the containers 13 for the separate collection of recyclable waste on the annular plane 26 is advantageous, since it allows to house a high number of containers 13 according to the variety of materials to be separated, as well as the amount of rubbish that can be generated.

However, it is not excluded that the containers 13 for the separate collection of recyclable waste can be positioned on the circular plane 25 and those for the food waste on the annular plane 26.

The number of containers 13 on the circular plane 25 can vary, for example, from 2 to 6, preferably from 3 to 5 according to the bulk and on the needs of the user.

The number of containers 13 on the annular plane 26 for the collection of recyclable waste can vary, for example, from 4 to 15, preferably from 8 to 12, according to the number of different types of rubbish to be separated in the collection, or even the quantity of different types of rubbish that is generated.

According to one embodiment, the circular plane 25 can be fixed and provide at least two containers 13 positioned in the first reception position directly under the inlets 18, in order to receive organic material and used cooking oil respectively. In this way, the organic material and the used oil are not mixed together, they are collected in suitable containers 13 present in the containing structure 11 and are never in direct contact with the user, preventing the spread of unpleasant smells and the presence of insects.

According to another embodiment, the circular plane 25 is rotatable, providing at least two containers 13 selectively mobile in the reception position according to how full the previous container 13 is. In this way, advantageously, it is possible to accumulate a larger quantity of food waste in a small space.

According to a variant embodiment, another intermediate concentric plane can be provided, interposed between the circular plane 25 and the annular plane 26, suitable to selectively move the containers 13 that are intended for, for example, the used oil in the first reception position under the used oil inlet 18.

In this way, the circular plane 25 can be used only for the containers 13 for organic waste and can be rotated or moved independently of the intermediate concentric plane or of the peripheral annular plane 26.

According to one embodiment, the annular plane 26 and the concentric circular plane 25 are selectively movable one independently from the other to each position one of the containers 13 selected in a first and in a second correct reception position respectively in correspondence with the first and the second aperture 14a, 14b.

For example, the annular plane 26 is configured to be selectively rotatable with respect to the concentric circular plane 25. In this way, the annular plane 26, rotating, displaces the container 13 used for a determinate type of recyclable waste to the second reception position, under the second aperture 14b, according to the identification of the type of recyclable waste obtained by means of the recognition means 23. According to one embodiment, the apparatus 10 could provide at least two separate containers 13 for metal waste, one for non-ferrous metal and one for ferrous metal.

According to one embodiment, the apparatus 10 could provide separate containers 13 for different types of plastic according to the composition and color thereof.

According to one embodiment, the apparatus 10 could provide at least one container 13 for paper and cardboard.

According to one embodiment, the apparatus 10 could provide separate containers 13 for different types of glass according to the color thereof.

In this way, the apparatus 10 advantageously allows to obtain a more specific and detailed separate collection with less user intervention and greater benefit for the subsequent recycling process carried out by third parties after the rubbish is collected.

Each container 13, provided in the mobile support 22, can be provided with a recognition identifier which distinguishes it from the other containers 13 according to the type of rubbish it contains and the position of the container 13 in the mobile support 22.

According to one embodiment, the mobile support 22 is configured to move into the correct reception position the container 13 with the identifier corresponding to the type of rubbish detected by the recognition means 23. In this way, advantageously, the separate collection is carried out and managed automatically by the apparatus 10.

Each recognition identifier can be memorized in the command and control unit 19 which, according to the type of rubbish identified by the recognition means 23, commands the selective rotation of the container 13 intended for the rubbish identified into the correct reception position.

According to one embodiment, the apparatus 10 comprises at least one compacting member 30 configured to compact the rubbish in a container 13 when the latter is moved, by means of the mobile support 22, to a correct compacting position, that is, directly under said compacting member 30. In this way, the filling space of the container 13 itself is maximized.

In particular, the compacting member 30 is provided with an extendable aim 33 provided at its end with a plate 34 suitable to be selectively moved inside each container 13 by means of the extension of the extendable arm 33. The extendable aim 33 could be telescopic.

The plate 34 has a shape substantially matching the cross-section of the container 13 and suitable to be inserted through the loading aperture 13a thereof so as to compress toward the bottom of the container 13 all the rubbish present therein.

The compacting member 30 can comprise an electric piston.

According to one embodiment, the compacting member 30 is configured to compact in sequence the rubbish of each container 13, rotatable on the annular plane 26, when the container 13 is disposed in the correct compacting position. In this way, advantageously, only one compacting member 30 can be provided, integrally attached to the containing structure 11, for compacting all the recyclable waste of each container 13 present on the annular plane 26.

According to a possible variant, the compacting member 30 can be selectively translatable inside the containing structure 11 toward a more internal concentric plane, for example toward the circular plane 25, so as to also be able to compact the food waste of the containers 13 disposed on the circular plane 25.

Possibly, one compacting member 30 can be provided for each concentric plane 25, 26 present in the mobile support 22.

According to one embodiment, the apparatus 10 comprises at least one motor 31 suitable to drive the shredding member 17. The motor 31 can also be suitable to drive the compacting member 30, for example by means of a suitable kinematic chain. The two shredding 17 and compacting 30 members can also be driven independently of one another.

According to one embodiment, the motor 31 can be associated with the command and control unit 19 which commands its drive in an automated manner According to one embodiment, the motor 31 can be of the type driven by the user through the command interface 27 provided on the front panel 16 of the apparatus 10.

According to a possible embodiment, each concentric plane 25, 26 can be provided with movement means 37 independent of each other to command the selective rotation of the concentric planes 25, 26. For example, the movement means 37 could be installed inside a platform 32 associated with the mobile support 22.

According to a possible embodiment, the movement means 37 can comprise an electric motor, for example of the stepper type, and a toothed wheel associated with each concentric plane 25, 26.

According to one embodiment, the drive of the movement means 37 as above can be commanded automatically by the command and control unit 19.

According to a possible embodiment, the drive of the movement means 37 as above can be commanded by the user through the command interface 27, so that the user actively commands the choice of the container 13 according to the type of rubbish that he/she introduces in the apertures 14a, 14b.

According to one embodiment, the mobile support 22 can be extracted from the containing structure 11 to allow the containers 13 to be replaced.

The mobile support 22 can be positioned inside an extractable drawer 35 provided in the internal compartment 12 of the containing structure 11. The extractable drawer 35 can be associated with the containing structure 11 by means of suitable sliding means, such as wheels, guides or sliding blocks.

In this way, the extractable drawer 35 is able to be selectively moved between a position inside the internal compartment 12 of the containing structure 11, in which it keeps the containers 13 in cooperation with the apertures 14a, 14b, and a second position at least partly outside the containing structure 11, in which it allows the extraction of the containers 13 from the mobile support 22, for the disposal of rubbish.

The containers 13 can be mounted on the mobile support 22 fitted in a selectively releasable manner, or inserted in suitable seatings 36 provided in the mobile support 22 as above.

According to one embodiment, the apparatus 10 comprises at least one filling sensor 28 configured to detect the filling of the container 13 when it is positioned in the correct reception position.

In particular, the filling sensor 28 can be securely positioned under the shredding member 17 in correspondence with the discharge funnel 24 so as to detect the filling of the container 13, of the annular plane 26, located in the second reception position.

According to a possible variant embodiment, each container 13 can be associated with a filling sensor 28 which detects when the container 13 reaches its maximum capacity.

This maximum capacity can be intended in terms of weight and/or volume according to the type of filling sensor 28 installed. For example, the filling sensor 28 could be a load sensor that measures the weight reached by the container while it is being filled with rubbish. This load sensor could be positioned laterally to or below each container 13.

The filling sensor 28 could be capacitive or optical and can be associated internally with the loading aperture 13a of the containers 13 so as to visually detect the volumetric filling of the container 13.

According to variant embodiments, the drive and movement of the shredding member 17, the compacting member 30, the temporary support 20 and the mobile support 22 can be commanded automatically by the command and control unit 19 according to the signals received from the recognition means 23 and the filling sensors 28, and according to the recognition identifiers of the containers 13 memorized in the command and control unit 19.

According to one embodiment, each filling sensor 28 can be associated with a sound emitting device which alerts the user when the maximum capacity has been reached.

According to another embodiment, each filling sensor 28 can be associated with the command interface 27 which notifies the user of the need to empty the container 13.

According to another embodiment, each filling sensor 28 can be associated with the command and control unit 19, or with another control system, which monitors and memorizes the data detected by the filling sensor 28 regarding the frequency with which the container 13 is emptied and the quantity of rubbish produced daily, weekly, monthly and/or annually.

The memorized data can be sent, by sharing means, directly to the user or to dedicated control centers located in municipalities, recycling centers or at companies contracted for rubbish disposal.

The sharing means could for example be dedicated apps and/or Bluetooth or wireless devices.

It is clear that modifications and/or additions of parts may be made to the apparatus 10 as described heretofore, without departing from the field and scope of the present invention.

It is also clear that, although the present invention has been described with reference to some specific examples, a person of skill in the art shall certainly be able to achieve many other equivalent forms of apparatus 10, having the characteristics as set forth in the claims and hence all coming within the field of protection defined thereby.

The invention claimed is:

1. Apparatus for the separate collection of rubbish, comprising a containing structure provided with an internal compartment in which there are a plurality of rubbish collection containers and with at least a first and a second aperture for access to said internal compartment from the outside, in order to introduce said rubbish, wherein said plurality of containers is disposed on a mobile support a drive of which is controlled by the action of a recognition means that recognize the type of rubbish, said recognition means being associated with said first and second apertures, in order to position a specific one of the containers selected in a correct reception position.

2. The apparatus as in claim 1, wherein said first aperture is intended for food rubbish selected at least between organic rubbish and/or used oil, and said second aperture is intended for other recyclable rubbish selected at least between paper, glass, plastic and metal.

3. The apparatus as in claim 2, wherein a shredding member is associated with said second aperture and is suitable to shred the recyclable rubbish.

4. The apparatus as in claim 3, wherein said second aperture is provided with a door that automatically closes after the introduction of the rubbish, and wherein said shredding member is activated manually or automatically only after said automatic closing.

5. The apparatus as in claim 3, wherein a temporary support is associated with said second aperture and is suitable to contain the rubbish before it is shredded by the shredding member, said temporary support being configured to discharge the rubbish into the shredding member after a door associated with the second aperture has been closed.

6. The apparatus as in claim 1, wherein each container provided on the mobile support is provided with a recognition identifier able to distinguish it from the other containers according to a specific type of rubbish and its position on said mobile support.

7. The apparatus as in claim 1, further comprising at least one compacting member configured to compact the rubbish in a container when the container is moved, by means of the mobile support, to a correct compacting position located under said compacting member.

8. The apparatus as in claim 1, wherein said mobile support is provided with at least two concentric planes, a circular or central plane in which the containers are disposed, suitable for the collection of food rubbish, and an annular or peripheral plane in which the containers are disposed in a circle, suitable for the separate collection of recyclable rubbish.

9. The apparatus as in claim 8, wherein said annular plane and said circular plane are selectively movable, one independently of the other, so as to each position one of the containers selected in a first and in a second correct reception position, respectively in correspondence with the first and second aperture.

10. The apparatus as in claim 1, further comprising at least one filling sensor configured to detect the filling of a container when it is in the correct reception position, wherein said mobile support can be extracted from the containing structure to allow the containers to be replaced.

11. The apparatus as in claim 1, wherein said first aperture is intended for food rubbish selected at least between organic rubbish and/or used oil, and said second aperture is intended for recyclable rubbish selected at least between paper, glass, plastic and metal,
- wherein a shredding member is associated with said second aperture and is suitable to shred the recyclable rubbish,
- wherein said second aperture is provided with a door that automatically closes after the introduction of the recyclable rubbish, and in that said shredding member is activated manually or automatically only after said automatic closing
- wherein a temporary support is associated with said second aperture and is suitable to contain the recyclable rubbish before it is shredded by the shredding member, said temporary support being configured to discharge the recyclable rubbish into the shredding member after a door associated with the second aperture has been closed,
- each container provided on the mobile support is provided with a recognition identifier able to distinguish it from the other containers according to a specific type of rubbish and its position on said mobile support,
- further comprising at least one filling sensor configured to detect the filling of a container when it is in the correct reception position, wherein said mobile support can be extracted from the containing structure to allow the containers to be replaced,
- wherein drive and movement of the shredding member, of the compacting member, of the temporary support and of the mobile support are automatically commanded by a command and control unit according to the signals received from the recognition means and the filling sensors, and according to the recognition identifiers of the containers memorized in said command and control unit.

* * * * *